(12) United States Patent
Horii et al.

(10) Patent No.: US 6,549,205 B1
(45) Date of Patent: Apr. 15, 2003

(54) METHOD OF DRAWING SHAPES

(75) Inventors: Youichi Horii, Kokubunji (JP); Hiroyuki Nomura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/514,283

(22) Filed: Feb. 28, 2000

(30) Foreign Application Priority Data

Jan. 24, 2000 (JP) ........................................ 2000-017876

(51) Int. Cl.⁷ ................................................. G06I 11/20
(52) U.S. Cl. ........................................ 345/442; 345/676
(58) Field of Search .................................. 345/442, 676

(56) References Cited

U.S. PATENT DOCUMENTS

| | | | |
|---|---|---|---|
| 5,309,554 A | * 5/1994 | Ito ............................. | 395/150 |
| 5,363,479 A | * 11/1994 | Olynyk ........................ | 395/142 |
| 5,367,617 A | * 11/1994 | Goossen et al. ............ | 395/142 |

OTHER PUBLICATIONS

Elaine Weinman/Peter Lourekas, PhotoShop for windows and Macintosh, 1998, 211–219, 78–79.*

* cited by examiner

*Primary Examiner*—Matthew C. Bella
*Assistant Examiner*—Mike Rahmjoo
(74) *Attorney, Agent, or Firm*—Antonelli, Terry, Stout & Kraus, LLP

(57) ABSTRACT

In a system for producing an animation on a computer by use of keyframes, shapes are drawn on the basis of the positions of vertices designated by a user without direct manipulation of control points for Bézier curve so that there is little problem even in the case where a line drawing of each handwritten keyframe is broken discontinuously. To this end, Bézier curves are automatically generated to draw shapes by fetching a plurality of keyframes written on paper into a computer and then setting vertices of only first one of the keyframes. On this occasion, an optimum path connecting the position of each of the set vertices to the current cursor position is calculated. The path is approximated by a cubic equation. A Bézier curve is defined on the basis of comparison of coefficients of respective terms in the equation with coefficients in the Bézier curve. For each of keyframes after the first keyframe, control points for Bézier curve are re-calculated to reshape shapes by moving vertices of the previously drawn shapes and by dragging the neighborhood of the contour of the keyframe.

2 Claims, 7 Drawing Sheets

FIG. 4

400  ROUTINE OF CALCULATING BÉZIER CURVE

600 ROUTINE OF RESHAPING SHAPES

FIG. 7
AUTOMATIC CALCULATION OF BEZIER CURVE

FIG. 8
TRANSLATING VERTICES AND CALCULATING BÉZIER CURVE

FIG. 9

METHOD OF DRAWING SHAPES

BACKGROUND OF THE INVENTION

The present invention relates to a method of drawing shapes and particularly to a method of drawing shapes, which is a method for aiding image drawing by computer graphics software for two-dimensional shapes and which is adapted to two-dimensional animation.

Cell-animation as a traditional technique was produced by the steps of: drawing immovable portions such as a background, etc. on paper; drawing movable portions such as a character, etc. on celluloid; and taking a photograph of a laminate of the paper and the celluloid by a camera. The step of drawing movable portions on celluloid was roughly classified into a process of keyframe drawing, a process of in-between drawing and a process of painting. In the process of keyframe drawing, frames serving as keys called keyframes were drawn on paper by rough line drawing. In the next process of in-between drawing, an in-between line drawing was made in between the keyframes on the paper by use of a careful line cleaned up. In the further process of painting, the animation image was transferred onto celluloid and painted at the back of the celluloid. On the other hand, a technique of digitized animation production advanced in recent years was a technique in which procedures on and after the process of painting were carried out by computer. That is, all animation images drawn on paper by manual work were fetched into a computer by a scanner, or the like, painted by painting software, or the like, and digitally synthesized with a background image.

That is, even in the digitized animation production, there was the existing condition that animation images were drawn on paper by manual work. The number of steps of the manual work was enormous. On the other hand, a technique of producing animation by fetching keyframes into a computer by a scanner, or the like, and by automatically in-betweening shapes between the keyframes by computer through generating graphics with reference to the keyframes was proposed as described in U.S. Application Ser. No. (not known), filed on Dec. 1, 1999 while claiming priority based on Japanese Patent Application No. 10-352258 filed on Dec. 11, 1998.

Figure 9:
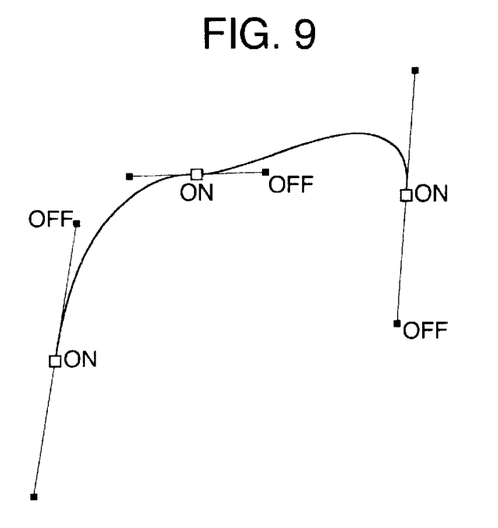
FIG. 9 is a view for explaining the generation of a Bézier curve.

A technique using a Bézier curve is generally used for generating graphics. This technique is widely employed in drawing software. For example, this technique is described in Adobe Illustrator 8.0 Manual Japanese version, page 65. As shown in FIG. 9, a Bézier curve is generally generated by a method in which the cursor position at the push of a button of a pointing device such as a mouse, or the like, is regarded as the position of a vertex whereas the cursor position at the release of the button is regarded as one control point for the Bézier curve. On this occasion, the other control point is set in a position symmetrical with respect to the vertex. After the Bézier curve is generated, a desired shape is obtained by directly manipulating the vertex and the Bézier control points as occasion demands.

An auto-tracing function for automatically generating a Bézier curve on the basis of a fetched image is also known. This is a function for generating a Bézier curve on the basis of color gamut information of an image specified by clicking the pointing device at a point of the image. (for example, as described in pages 100 and 101 of a manual attached to the software title "Illustrator 8.0 Edition Japanese version" sold by Adobe Systems Incorporated).

SUMMARY OF THE INVENTION

The Bézier control points needed to be directly manipulated for generating and reshaping the aforementioned general Bézier curve. There was a problem that much labor was required for directly manipulating the Bézier control points because there were two Bézier control points for one vertex.

On the other hand, the auto-tracing function had a problem that it was impossible to generate the Bézier curve exactly when there was a gap in the color gamut, that is, when the handwritten line drawing was broken discontinuously. The auto-tracing function had also a problem that it was difficult to obtain natural in-betweening results when automated in-betweening was performed by computer because the position of the vertex was generated automatically by computer.

An object of the present invention is to provide a method of drawing shapes, which is applied to software for fetching keyframes into a computer and drawing shapes while tracing the keyframes and in which control points for a Bézier curve need not be directly manipulated but the position of a vertex is designated by a user without problem even in the case where a line drawing of each of the keyframes is broken discontinuously.

According to an aspect of the present invention, a plurality of keyframes drawn on sheets of paper are first fetched into a computer. Then, a user traces the contour of the first keyframe by Bézier curves. On this occasion, the computer automatically generates Bézier curves successively on the basis of information of the positions of vertices of the Bézier curves and information of the keyframe fetched into the computer only by user's designating points as the vertices successively. For automatic calculation, an optimum path for connecting the last designated vertex and the current cursor position to each other is obtained and approximated by a cubic equation, so that Bézier curves are generated on the basis of comparison of coefficients of terms in the equation with coefficients in the Bézier curves.

With respect to the second keyframe et seq., the vertices of the previously generated Bézier curves are moved so manually as to be placed on the contour of each keyframe. Further, when the neighborhood of the contour is dragged by a mouse, Bézier curves are calculated again so as to be fit for the dragged locus.

DETAILED DESCRIPTION OF EMBODIMENTS

Embodiment 1

An embodiment of the present invention will be described below with reference to the drawings.

(1) System Configuration

Figure 1:
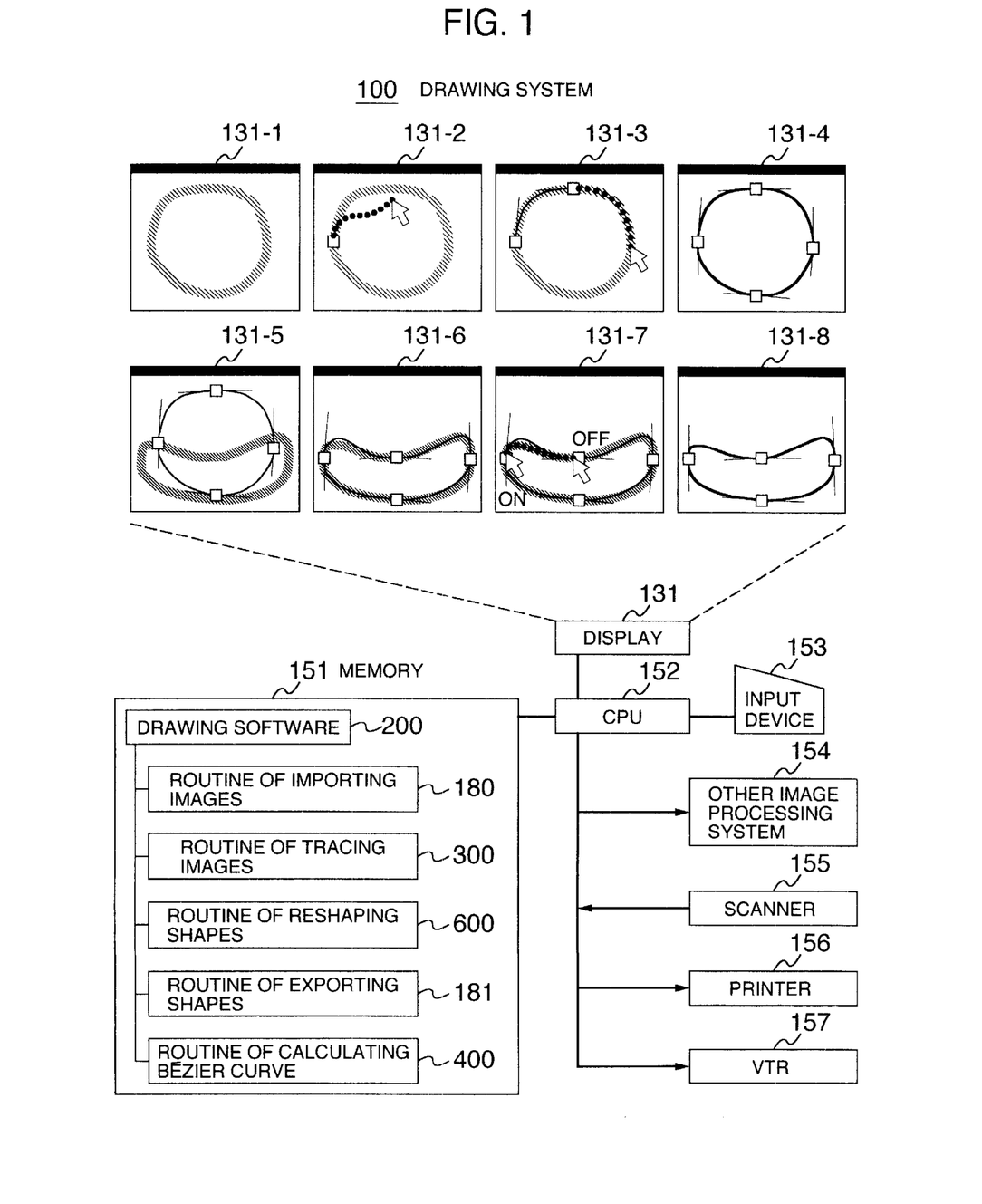
FIG. 1 is a view showing a drawing system according to an embodiment of the present invention and examples of scenes expressed on a display.

FIG. 1 shows a drawing system according to an embodiment of the present invention.

Scenes 131-1 to 131-8 show examples of scenes expressed on a display 131 in this system.

A drawing software 200 using the method of drawing shapes according to the present invention is provided in a memory 151 connected to a central processing unit (CPU) 152.

The drawing software 200 operates routines 180, 300, 600, 181 and 400 to perform processing.

That is, the image importing routine 180 is started so that a first handwritten image is imported and is displayed on the display 131 as occasion demands (131-1).

The image tracing routine 300 is started so that the image is traced by a closed curve constituted by Bézier curves and is displayed on the display 131 as occasion demands. The reference numeral 131-2 designates an intermediate scene in which the second vertex is being designated. In the scene 131-2, there is displayed a Bézier curve which connects the first vertex to the current cursor position pointed by a pointing device 153 so that the curve is drawn along the contour of the image as close as possible (the Bézier curve is shown by the dotted line). The reference numeral 131-3 designates an intermediate scene 131-3 in which the third vertex is being designated after calculation of the Bézier curve for a section between the first and second vertices. The reference numeral 131-4 designates a resulting scene in which designation of all vertices and calculation of Bézier curves for all sections has been completed. Edge points of two segments extended from each vertex show control points for a corresponding Bézier curve.

Then, the image importing routine 180 is restarted so that a different handwritten image is imported and displayed on the display 131 as occasion demands (131-5).

The shape reshaping routine 600 is started so that the shape is reshaped in accordance with the imported different image. If the cursor is located on a vertex of the shape when a button of the pointing device 153 is pushed, the vertex of the shape is moved correspondingly onto the contour of the imported image (131-6). On this occasion, each of control points is moved in parallel by the same distance as the moved distance of the manually moved vertex in order to keep the shape round.

If the button is pushed in a place except vertices, respective dark points (points lowest in brightness) nearest to points on the locus of the cursor until release of the button are selected among darker points on the image than a threshold (which can be determined at user's option). A Bézier curve is calculated on the basis of the train of selected points (131-7). The reference numeral 131-8 designates a resulting scene in which reshaping has been performed upon all sections.

Finally, the shape exporting routine 181 is started so that shape data corresponding to the imported image are exported to the memory.

The generated shape data are sent to another image processing system 154 as occasion demands, and then are imported to a printer 156 so as to be printed on paper or are imported to a VTR 157 so as to be provided as a video software. Specifically, another image processing system may be a system using computer graphics software, two-dimensional drawing software, word processing software, or the like. The image tracing routine 300, the shape reshaping routine 600 and the Bézier curve calculating routine 400 used by those routines 300 and 600 will be described later in detail.

(2) Process Flow

Figure 2:
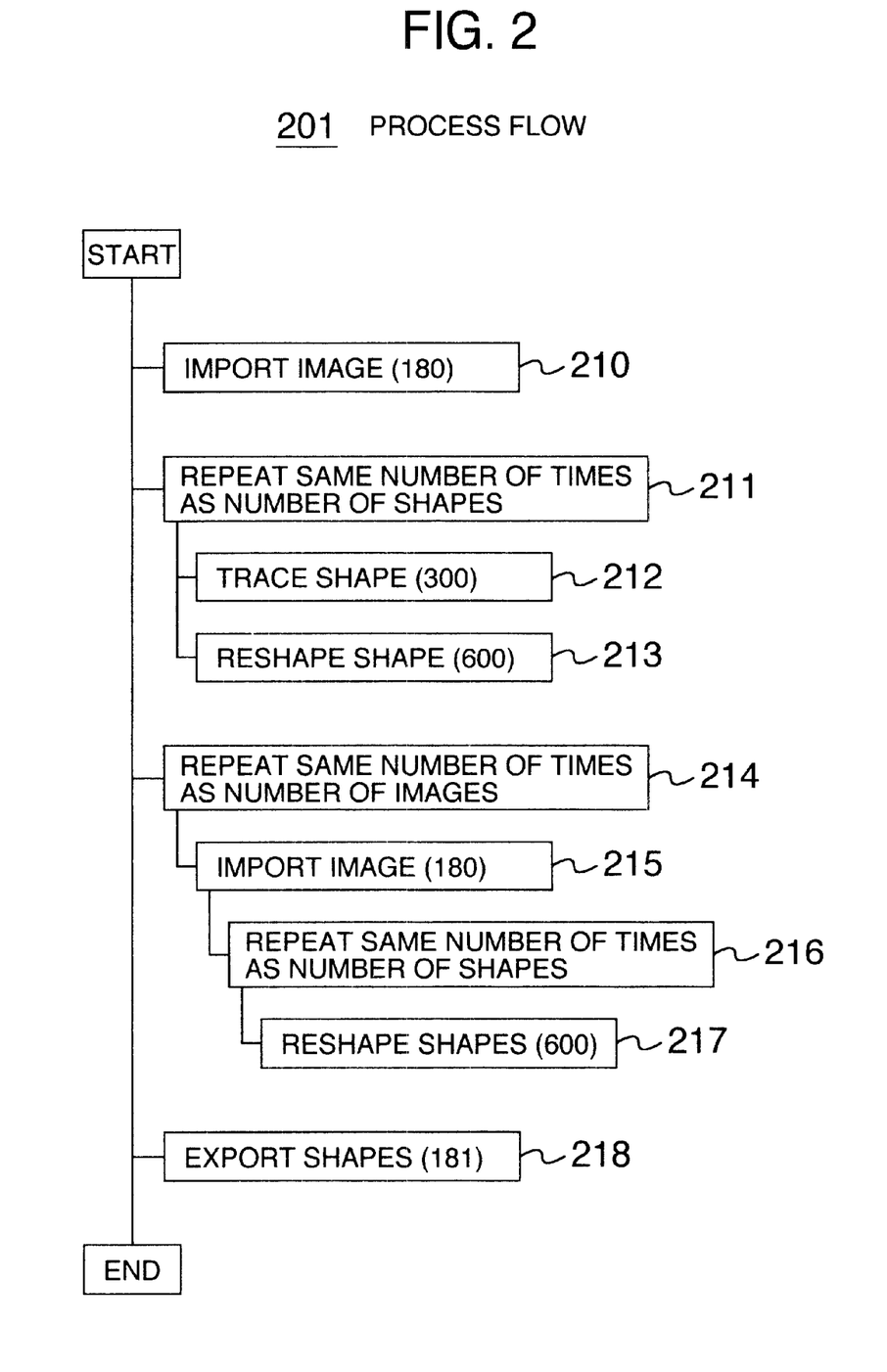
FIG. 2 is a chart showing a process flow in Embodiment 1.

Referring to FIG. 2, a process flow 201 in this embodiment will be described. First, the drawing software 200 in the memory 151 is started.

In step 210, the image importing routine 180 is started so that a first image is imported.

In step 211, steps 212 and 213 are repeated by the same number of times as the number of shapes contained in the image.

In step 212, the image tracing routine 300 is started so that a shape constituted by a Bézier curve corresponding to a portion of the image is generated.

In step 213, as occasion demands, the shape reshaping routine 600 is started so that the shape is reshaped.

In step 214, if there are two or more relevant images for the purpose of animation or the like, step 215 and steps after the step 215 are repeated by the same number of times as the number of images.

In step 215, the image importing routine 180 is restarted so that another image is imported.

In step 216, step 217 is repeated by the same number of times as the number of shapes generated by the step 211.

In step 217, as occasion demands, the shape reshaping routine 600 is started so that the shapes are reshaped.

In step 218, the shape exporting routine 181 is started so that shape data corresponding to the imported images are exported to the memory.

(3) Image Tracing Routine

Figure 3:
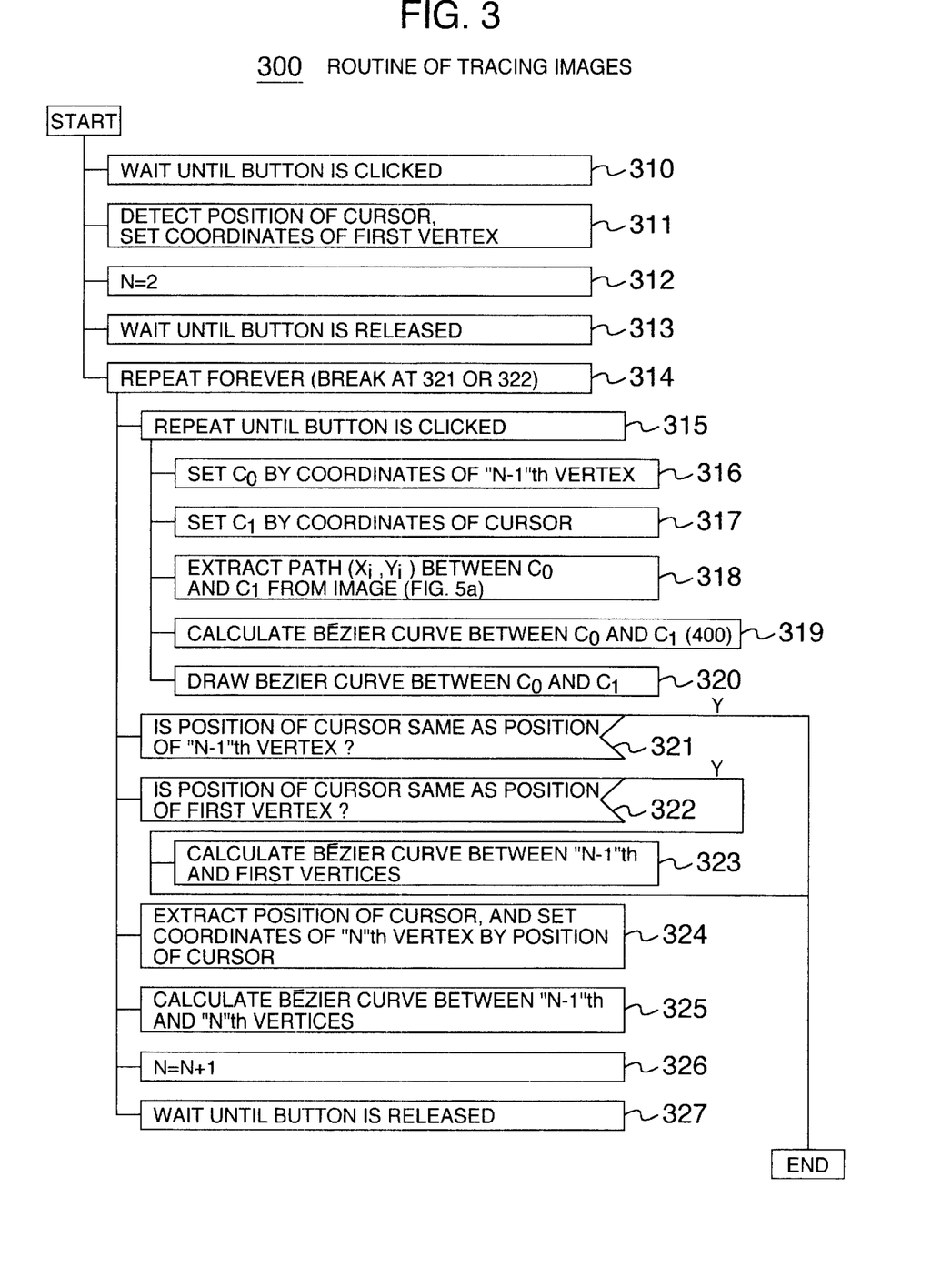
FIG. 3 is a chart for explaining a routine of tracing images in Embodiment 1.
Figure 5A:
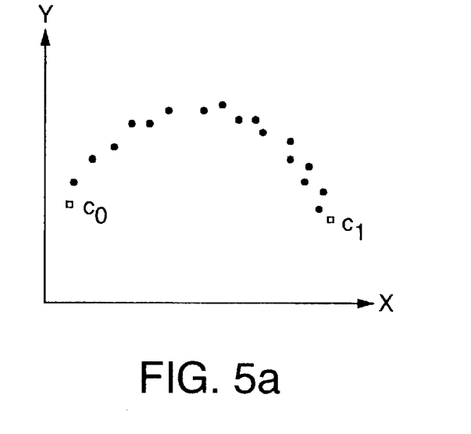
FIGS. 5*a* to 5*e* are graphs for supplementing the explanation of the routine of calculating a Bézier curve in Embodiment 1.

Referring to FIG. 3 and FIG. 5a, the image tracing routine 300 will be described.

In the image tracing routine 300, shapes corresponding to imported images are generated.

A flow for generating one shape corresponding to a portion of an image will be described below.

In step 310, waiting is made until a button of the pointing device 153 is clicked.

In step 311, the cursor position is detected and the coordinates of the first vertex are set.

In step 312, the counter N is set by "2", in which N is a counter variable showing the number of vertices.

In step 313, waiting is made until the button of the pointing device 153 is released.

In step 314, the following steps are repeated forever but the endless loop is broken in accordance with the condition of step 321 or 322.

In step 315, steps 316 to 320 are repeated.

In step 316, $C_0$ is set by the coordinates of the (N−1)th vertex.

In step 317, $C_1$ is set by the coordinates of the cursor indicating the current position of the pointing device.

In step 318, a path $(X_i, Y_i)$ between $C_0$ and $C_1$ is extracted from the image. The path $(X_i, Y_i)$ is expressed by a train of points including $C_0$ as its start point and $C_1$ as its end point. The path is extracted so as to be arranged along the line drawn on the image. Such path extraction is a technique known in the field of image recognition. FIG. 5a shows an example of the extracted path.

In step 319, the Bézier curve calculating routine 400 is started so that a Bézier curve between $C_0$ and $C_1$ is calculated on the basis of $C_0$, $C_1$ and the path $(X_i, Y_i)$.

In step 320, the Bézier curve between $C_0$ and $C_1$ is drawn on the display 131.

In step 321, this routine is terminated if the cursor position is sufficiently near to the position of the (N−1)th vertex after the button of the pointing device is released.

In step 322, this routine is terminated via step 323 if the cursor position is sufficiently near to the position of the first vertex.

In step 323, a Bézier curve between the (N−1)th and first vertices is calculated. In this case, the shape is generated as a closed curve having its start and end points coincident with each other.

In step 324, the cursor position is extracted so that the coordinates of the Nth vertex is set by the cursor position.

In step 325, a Bézier curve between the (N−1)th and Nth vertices is calculated.

In step 326, N is increased by one.

In step 327, waiting is made until the button is released. Then, the situation of the routine goes back to the step 315.

(4) Bézier Curve Calculating Routine

Referring to FIG. 4 and FIGS. 5b to 5e, the Bézier curve calculating routine 400 will be described.

Figure 4:
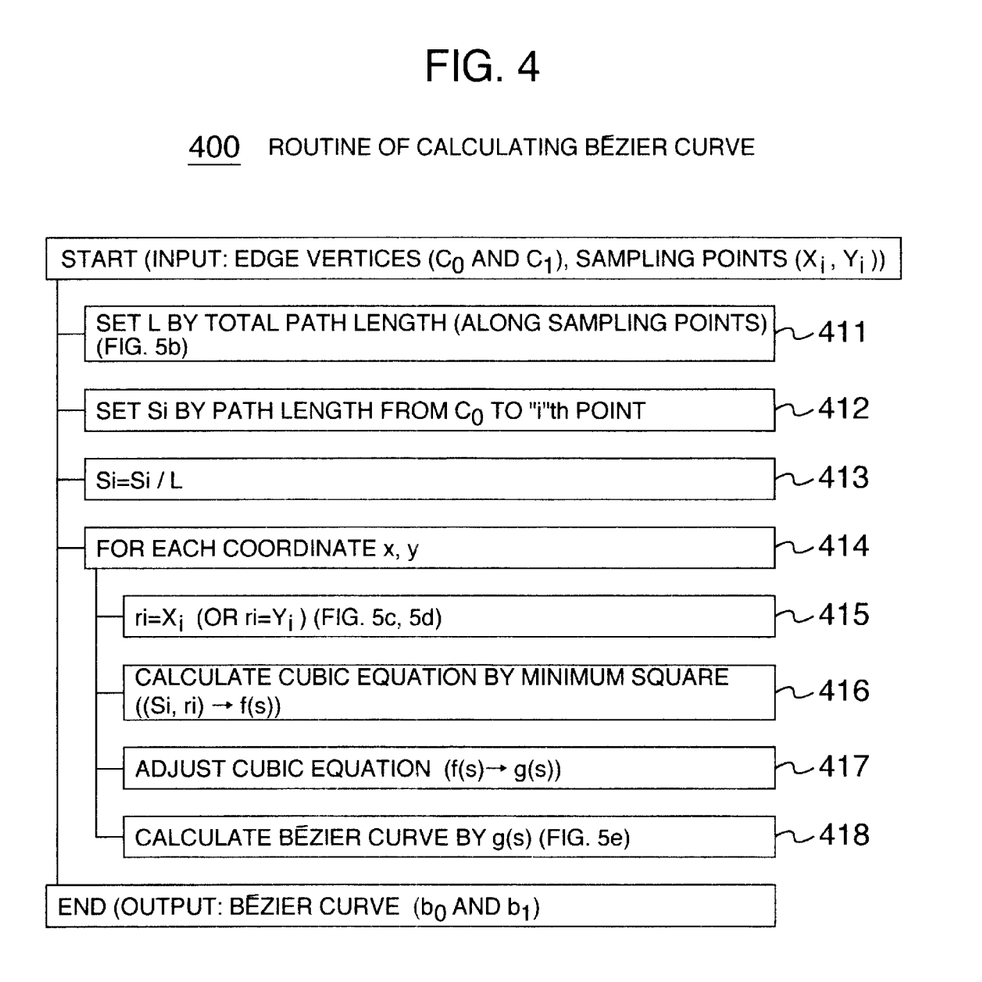
FIG. 4 is a chart for explaining a routine of calculating a Bézier curve in Embodiment 1.

In the Bézier curve calculating routine, edge vertices ($C_0$ and $C_1$) and sampling points (that is, extracted path ($X_i, Y_i$)) are used as input data whereas control points ($b_0$ and $b_1$) for a Bézier curve are used as output data.

Figure 5B:
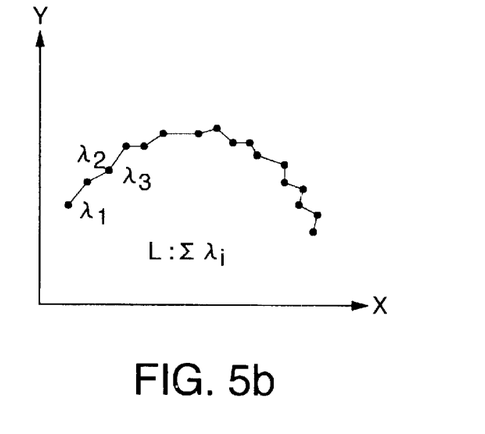

In step 411, the total length of the path is obtained so that L is set by the total length of the path. That is, as shown in FIG. 5b, the total length of the path is obtained by integrating respective distances $\lambda_i$ between adjacent points in the train of points along the path.

In step 412, $s_i$ are set by respective distances from $C_0$ to the points of the path.

In step 413, each component of $s_i$ is divided by L so as to be normalized in a range of from 0 to 1.

In step 414, the coordinates of Bézier control points ($b_0$ and $b_1$) to be calculated by the following steps 415 to 418 are individuated into abscissas X and ordinates Y.

Figure 5C:
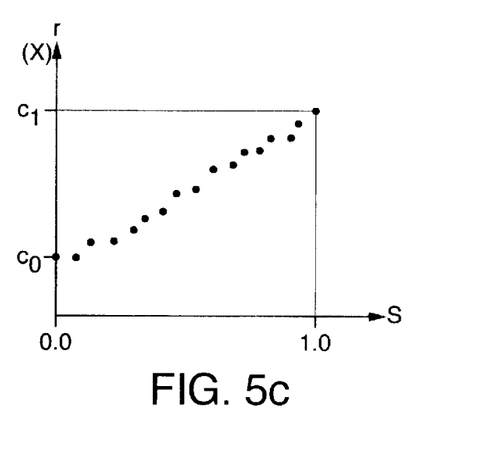
Figure 5D:
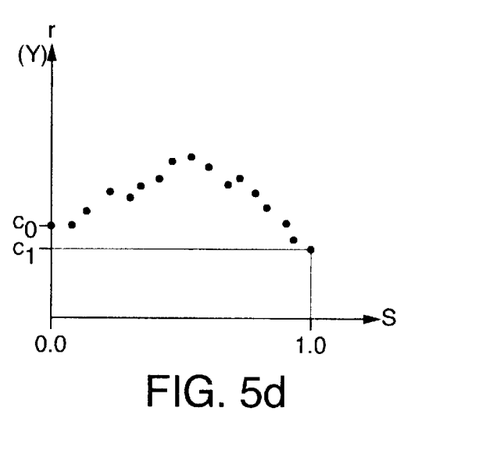
Figure 5E:
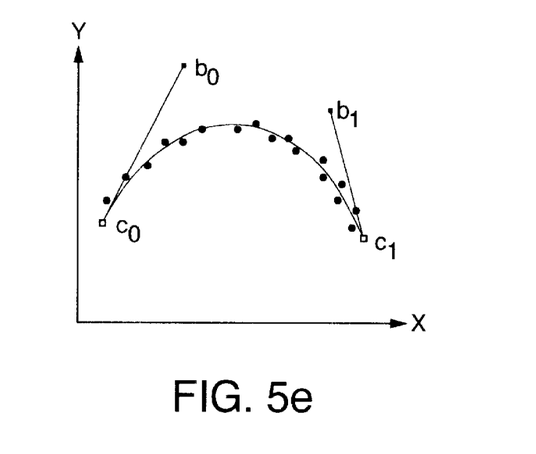

In step 415, $r_i$ are set by $X_i$ for the abscissas X and by $Y_i$ for the ordinates Y. FIG. 5c shows ($s_i, r_i$) for the abscissas X. FIG. 5d shows ($s_i, r_i$) for the ordinates Y.

In step 416, a cubic equation f(s) is calculated on the basis of ($s_i, r_i$) by a method of minimum square. That is, when the constant term ($s^0$), the coefficient of the linear term ($s^1$), the coefficient of the quadratic term ($S^2$) and the coefficient of the cubic term ($s^3$) in a cubic equation f(s) are $\theta_0, \theta_1, \theta_2$ and $\theta_3$ respectively, the coefficients are determined as values to minimize $\epsilon$ in the following expression.

$$\epsilon = \sum_{i}^{n-1} \left( \sum_{j}^{3} \theta_j s_i^j - r_i \right)^2 \quad \text{(Expression 1)}$$

To obtain the coefficients, matrices $\Theta$, S and R are defined as follows.

$$\Theta = \begin{pmatrix} \theta_0 \\ \theta_2 \\ \theta_2 \\ \theta_3 \end{pmatrix} \quad \text{(Expression 2)}$$

$$S = \begin{pmatrix} s_0^0 & s_0^1 & s_0^2 & s_0^3 \\ s_1^0 & s_1^1 & s_1^2 & s_1^3 \\ s_2^0 & s_2^1 & s_2^2 & s_2^3 \\ . & . & . & . \\ . & . & . & . \\ s_{n-1}^0 & s_{n-1}^1 & s_{n-1}^2 & s_{n-1}^3 \end{pmatrix} \quad \text{(Expression 3)}$$

$$R = \begin{pmatrix} r_0 \\ r_1 \\ r_2 \\ . \\ . \\ r_{n-1} \end{pmatrix} \quad \text{(Expression 4)}$$

A matrix $\Theta$ with respect to the coefficients to minimize $\epsilon$ is given by the following expression:

$$\Theta = ({}^t SS)^{-1 t} SR \quad \text{(Expression 5)}$$

in which "−1" means an inverse matrix, and "t" means a transposed matrix. From the above description, the respective coefficients $\theta_0, \theta_1, \theta_2$ and $\theta_3$ in the cubic equation f(s)

$$f(s) = \theta_3 s^3 + \theta_2 s^2 + \theta_1 s + \theta_0 \quad \text{(Expression 6)}$$

are obtained so that the cubic equation is fit for sampling points. There is, however, no guarantee that this equation will pass through the edge vertices ($C_0$ and $C_1$). Therefore, step 417 is provided for adjusting the cubic equation.

In step 417, an equation g(s) passing through the edge vertices ($C_0$ and $C_1$) is calculated by use of f(s). First, g(s) is defined as shown in the following expression. That is, the constant term ($s^0$), the coefficient of the linear term ($s^1$), the coefficient of the quadratic term ($s^2$) and the coefficient of the cubic term ($s^3$) in the equation g(s) are set by $\theta'_0, \theta'_1, \theta'_2$ and $\theta'_3$ respectively.

$$g(s) = \theta'_3 s^3 + \theta'_2 s^2 + \theta'_0 \quad \text{(Expression 7)}$$

Because g(s) for s=0 coincides with the horizontal (or vertical) component of $C_0$, the following expression should hold.

$$g(0) = \theta'_0 = c_0 \quad \text{(Expression 8)}$$

Because g(s) for s=1 also coincides with the horizontal (or vertical) component of $C_1$, the following expression should hold.

$$g(1) = \theta'_3 + \theta'_2 + \theta'_1 + \theta'_0 = c_1 \quad \text{(Expression 9)}$$

If the direction of a line tangent to f(s) at s=0 further coincides with the direction of a line tangent to g(s) at s=0, the following expression should hold.

$$g'(0) = f'(0) = \theta'_1 = \theta_1 \quad \text{(Expression 10)}$$

If the direction of a line tangent to f(s) at s=1 further coincides with the direction of a line tangent to g(s) at s=1, the following expression should hold.

$$g'(1) = f'(1) = 3\theta'_3 + 2\theta'_2 + \theta'_1 \quad \text{(Expression 11)}$$
$$= 3\theta_3 + 2\theta_2 + \theta_1$$

From the expressions 8 to 11, the respective coefficients in g(s) are calculated.

In step 418, Bézier control points ($b_0$ and $b_1$) are obtained from g(s). A Bézier curve is defined by the following expression.

$$a(s) = (2c_0 - 2c_1 + 3b_0 - 3b_1)s^3 \quad \text{(Expression 12)}$$
$$+(-3c_0 + 3c_1 - 6b_0 + 3b1)s^2$$
$$+3b_0 s$$
$$+c_0$$

The respective components of $b_0$ and $b_1$ are obtained by comparing the constant term ($s^0$), the coefficient of the linear term ($s^1$), the coefficient of the quadratic term ($s^2$) and the coefficient of the cubic term ($s^3$) in the Bézier curve equation a(s) with those in g(s).

$$b_0 = \theta'_1/3 \quad \text{(Expression 13)}$$
$$b_1 = \theta'_2/3 - (c_1 - c_0) + 2b_0 \quad \text{(Expression 14)}$$

By the aforementioned routine, the Bézier curve can be defined on the basis of the edge vertices and sampling points.

(5) Shape Reshaping Routine

Figure 6:
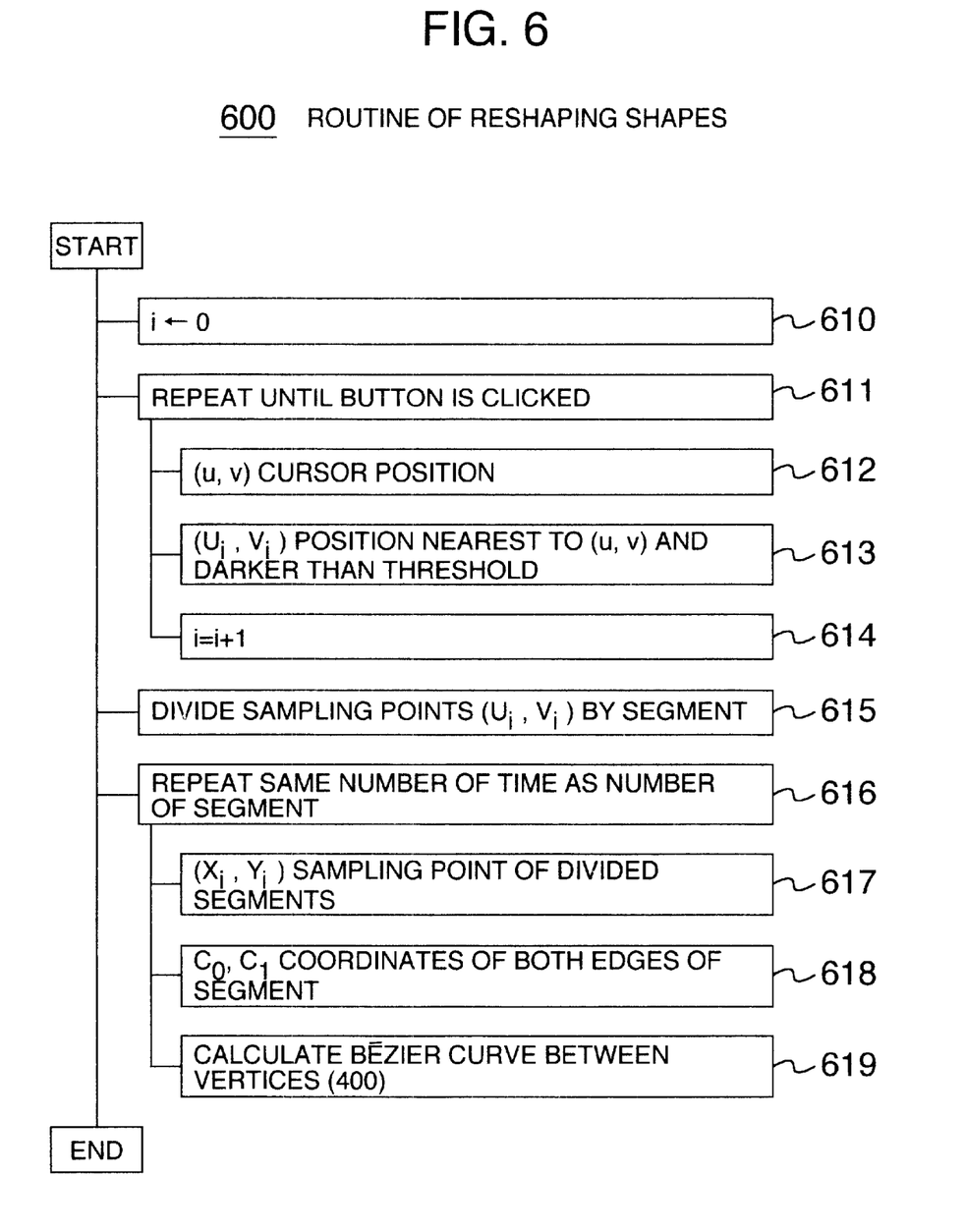
FIG. 6 is a chart for explaining a routine of reshaping shapes in Embodiment 1.

In the shape reshaping routine 600, shapes which have been already set are reshaped.

If the cursor is located on a vertex of a shape when the button of the pointing device 153 is pushed, the vertex of the shape is moved. On this occasion, each of Bézier control points is also moved by the same distance as the moved distance of the vertex. If the button is pushed in a place except vertices, respective dark points nearest to points on the locus of the cursor until the release of the button are selected among darker points on the image than a threshold so that a Bézier curve is calculated on the basis of the train of selected points. Referring to FIG. 6, the re-calculation of the Bézier curve will be described below.

In step 610, the counter i is set by 0.

In step 611, steps 612 to 614 are repeated while the button of the pointing device is pushed.

In step 612, (u, v) are set by the coordinates of the cursor position.

In step 613, ($U_i$, $V_i$) are set by the coordinates of the point nearest to (u, v) and selected from darker points on the image than a threshold.

In step 614, i is increased by one.

In step 615, sampling points ($U_i$, $V_i$) are divided by segment. That is, respective sampling points nearest to vertices of a shape are calculated and divided into sets of points each having sampling points, as its both edges, corresponding to adjacent vertices of the shape.

In step 616, steps 617 to 619 are repeated by the same number of times as the number of divided segments.

In step 617, ($X_i$, $Y_i$) are set by the coordinates of each of the sampling points of the divided segments.

In step 618, $C_0$ and $C_1$ are set by the coordinates of vertices of the shape corresponding to both edges of each segment.

In step 619, a Bézier curve between vertices is calculated on the basis of $C_0$, $C_1$ and ($X_i$, $Y_i$) by the Bézier curve calculating routine 400.

Embodiment 2

Figure 7:
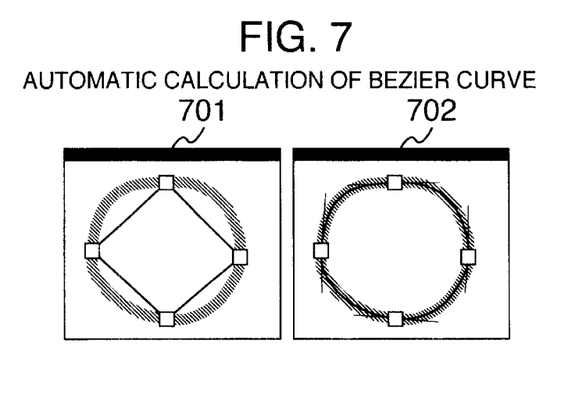
FIG. 7 is a view for explaining Embodiment 2.

Referring to FIG. 7, another embodiment will be described.

After a polygon is generated, the polygon is automatically transformed into Bézier curves so as to be fit for an imported image.

First, as shown in 701, the image importing routine is started so that an image is imported. A polygon is generated on the imported image.

Then, optimum paths ($X_i$, $Y_i$) connecting adjacent vertices are extracted for all sections between adjacent vertices of the polygon in the same manner as shown by the step 318 in FIG. 3. Further, $C_0$ and $C_1$ are set by the coordinates of both edge vertices. The Bézier curve calculating routine is started so that control points of each Bézier curve are calculated on the basis of $C_0$, $C_1$ and ($X_i$, $Y_i$). The reference numeral 702 designates a result of the automatic calculation.

Embodiment 3

Figure 8:
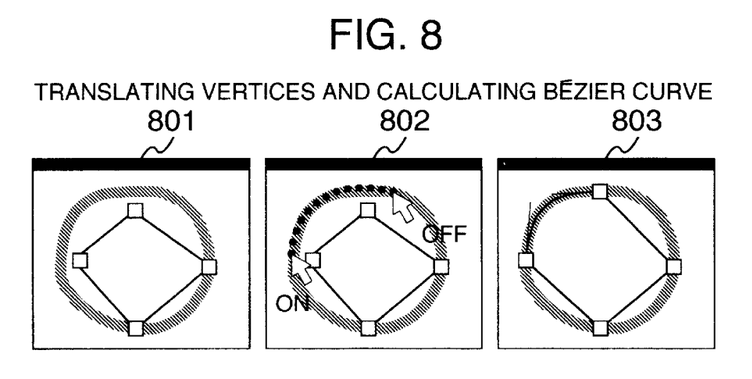
FIG. 8 is a view for explaining Embodiment 3.

Referring to FIG. 8, a further embodiment will be described.

After a polygon is generated, the polygon is transformed into Bézier curves so as to be fit for an imported image by designating paths.

First, as shown in 801, the image importing routine is started so that an image is imported. A polygon is generated on the imported image.

Then, as shown in 802, respective dark points nearest to points on the locus of the cursor in a period between push and release of the button of the pointing device are selected among darker points on the image than a threshold.

As shown in 803, vertices of the polygon are first moved to sets of the nearest points and then Bézier curves are calculated on the basis of these sets of points.

This embodiment is effective to the case where vertices of the initially generated polygon are out of the contour of the image.

According to the aforementioned embodiments, Bézier curves for a first keyframe imported to a computer can be automatically generated when vertices of the first keyframe are merely selected, and shapes for keyframes after the first keyframe can be reshaped by re-calculation of control points for the Bézier curves when vertices of the previously generated shapes are moved and the neighborhood of the contour of each keyframe is dragged. Accordingly, there is little problem even in the case where the contour of the keyframe is broken discontinuously. Natural in-betweening can be obtained by automated in-betweening because the position of vertices are designated by a user. An animated picture can be produced easily because it is unnecessary to manipulate control points for Bézier curves directly.

What is claimed is:

1. A method of drawing shapes, comprising:
   (1) a first step in which, in order to trace, with Bézier curves, a contour of a first one of first and second keyframes stored in a memory on a computer, digitized as digital data and made consecutive to produce an animation, a Bézier curve between first and second vertices on the contour of said first keyframe is drawn when said second vertex is designated by use of a pointing device after said first vertex is designated, and above process is repeated between respective adjacent vertices on the contour of said first keyframe to thereby trace the contour of said first keyframe with Bézier curves;
   (2) a second step in which said Bézier curves obtained by tracing the contour of said first keyframe are displayed on a display so that said Bézier curves are superimposed on said second keyframe; and
   (3) a third step in which, in a condition that said Bézier curves and said second keyframe are displayed on said display so that said Bézier curves are superimposed on said second keyframe, when a reshaping operation is performed manually by dragging said vertex by said pointing device in order to trace the contour of said second keyframe, and in the case where the position of each of vertices of said Bézier curves is judged to be anticoincident with the cursor position indicating the current position of said pointing device on said display while the button of said pointing device is pushed, a first train of points nearest to points on a locus of the cursor in a period between push and release of a button of said pointing device and darker than a predetermined threshold of brightness among a plurality of points constituting the contour of said second keyframe, and Bézier curves are calculated on the basis of said train of first points to regard said Bézier curves as a line drawing for tracing said second keyframe.

2. A method of drawing shapes which comprises, in a condition that Bézier curves traced from a first keyframe and a second keyframe are displayed on a display so that said Bézier curves from the first keyframe are superimposed on said second keyframe, a step in which, in a case where an operation of reshaping said Bézier curves is performed manually by dragging each of vertices of said Bézier curves by said pointing device to thereby trace the contour of said keyframe with the reshaped Bézier curve, and when the position of each of vertices of said Bézier curve is judged to be anticoincident with the cursor position indicating the current position of said pointing device on said display while a button of said pointing device is pushed, said Bézier curve is drawn on the basis of a locus of the cursor during the dragging operation of said pointing device so that said Bézier curve is attracted by the contour of said keyframe.

* * * * *